United States Patent
Chan et al.

(10) Patent No.: US 11,329,967 B2
(45) Date of Patent: *May 10, 2022

(54) KEY-LADDER PROTECTED PERSONALIZATION DATA CONVERSION FROM GLOBAL TO UNIQUE ENCRYPTION

(71) Applicant: ARRIS Enterprises LLC, Suwanee, GA (US)

(72) Inventors: Tat Keung Chan, San Diego, CA (US); Alexander Medvinsky, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 167 days.

This patent is subject to a terminal disclaimer.

(21) Appl. No.: 16/882,201

(22) Filed: May 22, 2020

(65) Prior Publication Data

US 2020/0374275 A1 Nov. 26, 2020

Related U.S. Application Data

(60) Provisional application No. 62/852,446, filed on May 24, 2019.

(51) Int. Cl.
*H04L 29/06* (2006.01)
*G06F 21/62* (2013.01)
*H04L 9/08* (2006.01)

(52) U.S. Cl.
CPC ........ *H04L 63/062* (2013.01); *G06F 21/6245* (2013.01); *H04L 9/0869* (2013.01); *H04L 63/0442* (2013.01); *H04L 63/0876* (2013.01)

(58) Field of Classification Search
CPC . H04L 63/062; H04L 9/0869; H04L 63/0442; H04L 63/0876; G06F 21/6245
USPC .......................................................... 713/171
See application file for complete search history.

(56) References Cited

U.S. PATENT DOCUMENTS

| | | | |
|---|---|---|---|
| 10,839,048 B2 * | 11/2020 | Chan | H04L 9/0861 |
| 2004/0105548 A1 | 6/2004 | Fujiwara et al. | |
| 2006/0184796 A1 | 8/2006 | Fahrny | |
| 2008/0028209 A1 | 1/2008 | Dare et al. | |
| 2014/0044265 A1 * | 2/2014 | Kocher | G06F 21/57 380/277 |
| 2018/0336321 A1 | 11/2018 | Chan et al. | |

OTHER PUBLICATIONS

International Search Report and Written Opinion Re: Application No. PCT/US2020/034397 dated Jul. 27, 2020.

(Continued)

*Primary Examiner* — Jacob Lipman
(74) *Attorney, Agent, or Firm* — Chernoff, Vilhauer, McClung & Stenzel, LLP

(57) ABSTRACT

A system and method of provisioning personalization data of a second type to a device having personalization data of a first type, the device having a global root key GK_0, and a secure processing environment having unique information is disclosed. In one embodiment, the method comprises accepting a provisioning request from the device, the provisioning request comprising the unique information and an identifier of a second type of provisioning data requested, converting the personalization data from the first type to the second type, and transmitting the converted personalization data to the device.

16 Claims, 11 Drawing Sheets

(56) References Cited

OTHER PUBLICATIONS

Butun et al. "Analysis of LoRaWAN v1.1 Security". SMARTOBJECTS'18, Jun. 25, 2018. Retrieved on Jul. 7, 2020, retrieved from <URL:https://dl.acm.org/doi/pdf/10.1145/3213299.3213304> entire document.

* cited by examiner

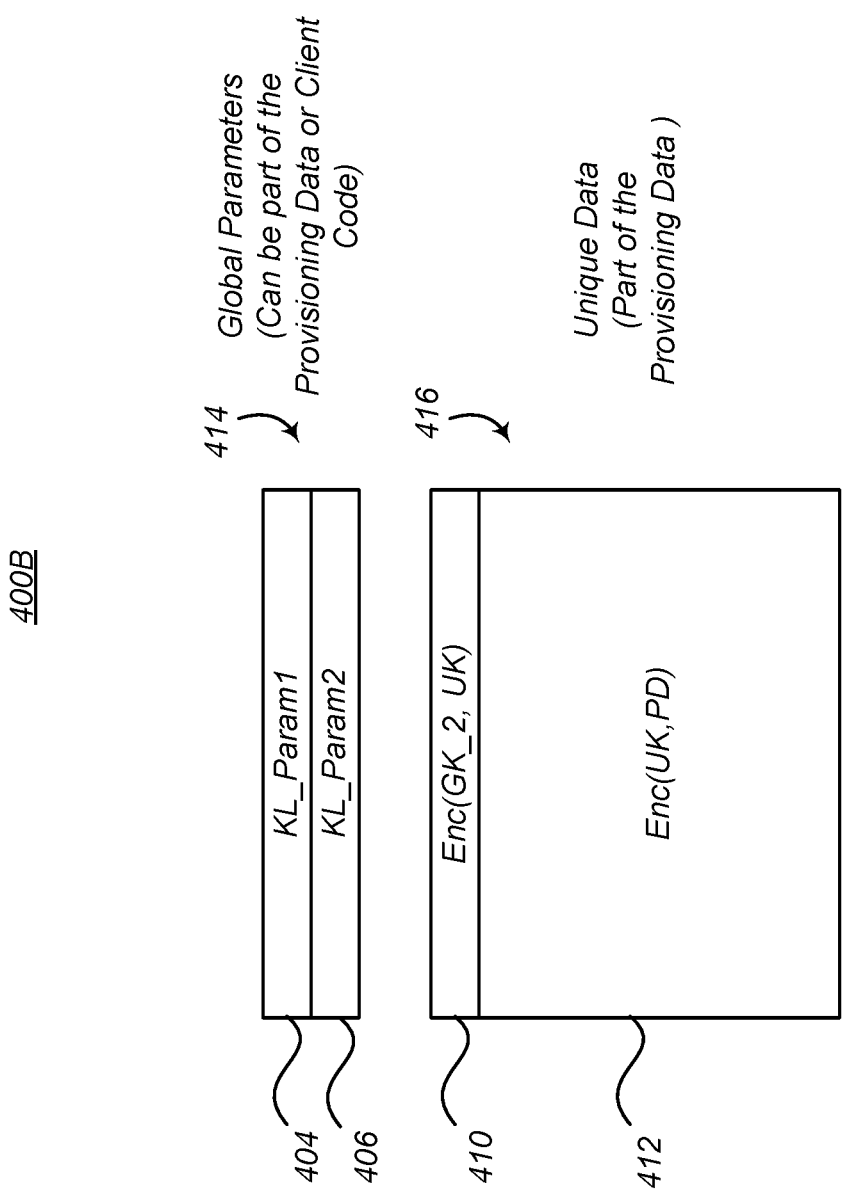

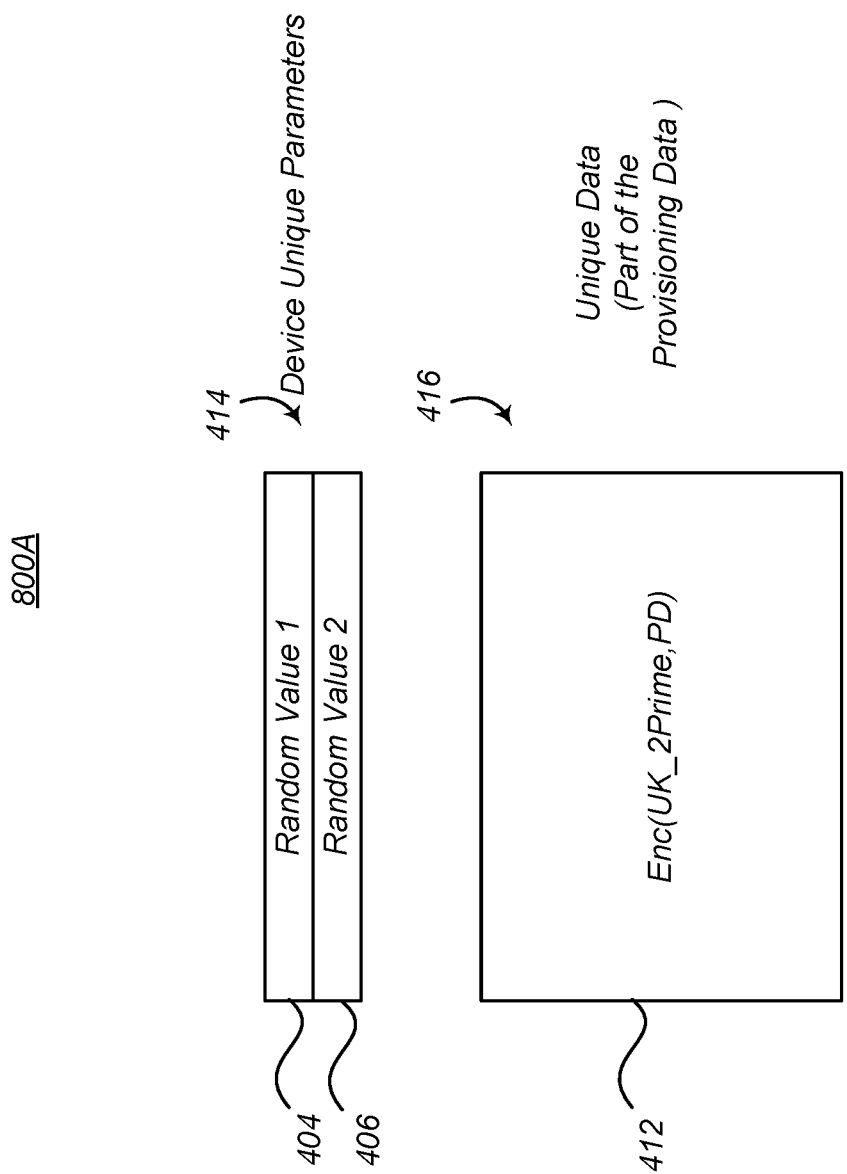

KEY-LADDER PROTECTED PERSONALIZATION DATA CONVERSION FROM GLOBAL TO UNIQUE ENCRYPTION

CROSS-REFERENCE TO RELATED APPLICATIONS

This application claims benefit of U.S. Provisional Patent Application No. 62/852,446, entitled "KEY-LADDER PROTECTED PERSONALIZATION DATA CONVERSION FROM GLOBAL TO UNIQUE ENCRYPTION REACH OF CONDITIONAL ACCESS SYSTEMS," by Tat Keung Chan and Alexander Medvinsky, filed May 24, 2019, which application is hereby incorporated by reference herein.

BACKGROUND

1. Field

The present disclosure relates to systems and methods for provisioning data to client devices, and in particular to a system and method for converting personalization data from globally encrypted (usable to a class of devices sharing the same global root key) to uniquely encrypted (usable only on a single target device).

2. Description of the Related Art

Many digital rights management (DRM) systems require personalization data (DRM client keys) to be provisioned on a device such as a client device such as a Set-Top Box (STB) either in the factory or in the field. Such DRMs include, for example, high-bandwidth digital content protection (HDCP), digital transmission content protection (DTCP), NETFLIX, WIDEVINE DRM, and PLAYREADY.

Typically the STB is built on a System-On-Chip (SOC) that include a general purpose host processor (Host, or referred to as the Rich Execution Environment (REE)) and a secure processor that provides a Trusted Execution Environment (TEE). The DRM systems are implemented as a trusted application (TA) in the TEE.

To protect the personalization data, the personalization data is typically encrypted in such a way that only the corresponding TA in the TEE can decrypt. This can be accomplished, for example, using a multi-stage key ladder based on a hardware global root key to generate another global key and using that global key to encrypt the personalization data. This personalization data may be thus encrypted offline and packaged for delivery to the device.

Typically, the hardware global root key is tied to a particular chip model (e.g. device model-based), and hence personalization data encrypted for devices using one model of chip cannot be decrypted by devices that use another model of chip. However, in field provisioning scenarios, a unique encryption specific to a particular chip (rather than a chip model) is desirable, so that the data can only be usable (decrypted) on the particular chip it is intended for.

What is needed is a solution that allows personalization data that is encrypted for one chip model to be converted for provisioning and use cryptographically restricted to a device having a particular chip (as opposed to chip model) that it was intended for. This disclosure presents a solution to that need.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

To address the requirements described above, this document discloses a system and method of provisioning device-specific uniquely encrypted personalization data to a device, the device having a global root key $GK\_0$ and a secure processing environment having unique information. The method comprises accepting a provisioning request from the device, the provisioning request comprising the unique information and an identifier of a type of provisioning data requested, converting the personalization data from globally-encrypted personalization data to the device-specific uniquely encrypted personalization data, and transmitting the converted personalization data to the device.

The globally-encrypted personalization data is generated by generating a first intermediate global key $GK\_1$ from a first global parameter $KL\_Param1$ and the global root key $GK\_0$, generating a second intermediate global key $GK\_2$ from a second global parameter $KL\_Param2$ and the first intermediate global key $GK\_1$, globally-encrypting the personalization data, and providing the globally-encrypted personalization data to a provisioning entity for storage.

Converting the personalization data from the globally-encrypted personalization data to the device-specific personalization data comprises decrypting the globally-encrypted personalization data, deriving a first device-specific unique parameter $KL\_Param1\_Prime$ and a second device-specific unique parameter $KL\_Param2\_Prime$ from at least the unique information, deriving a first intermediate device-specific unique key $UK\_1Prime$ from the derived first device-specific unique parameter $KL\_Param1\_Prime$ and the global root key $GK\_0$, deriving a second intermediate device-specific unique key $UK\_2Prime$ from the derived second device-specific unique parameter $KL\_Param2\_Prime$ and the derived first intermediate device-specific unique key $UK\_1Prime$, and generating the device-specific uniquely encrypted personalization data as the converted personalization data from the decrypted globally-encrypted personalization data and the derived second intermediate device-specific unique key $UK\_2Prime$.

Another embodiment is evidenced by an apparatus having a processor and a communicatively coupled memory storing processor instructions for performing the foregoing operations.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout:

FIGS. 4A-4B are diagrams illustrating exemplary embodiments of packaged provisioning data;

FIGS. 8A-8B are diagrams illustrating exemplary embodiments of packaged converted provisioning data;

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Overview

The system and method described below enables the secure and efficient conversion of model-specific encrypted personalization data to device-specific uniquely encrypted personalization data for field provisioning. This allows tying a record of personalization data to a particular chip using certain chip unique information (referred to as Chip Unique Info) in the derivation of the encryption key (GK_2). The Chip Unique Info may be a Chip ID that is provisioned to the chip, or a measurement calculated inside the chip, such as an encryption or decryption operation with a unique per-chip HW protected key.

Notation

In the following description, we use Enc(K, D) to denote the encryption of the data "D" using the key "K"; and Dec(K, D) to denote the decryption of the data "D" using the key "K".

Abbreviations

API: Application Programming Interface
PD: Personalization Data
SOC: System-On-Chip
PS: Provisioning Server
UK: Unique Key
IV: Initialization Vector
TA: Trusted Application
TEE: Trusted Execution Environment
GK: Global Key
ID: Identity/Identifier
HSM: Hardware Security Module
DH: Diffie-Hellman
ECDH: Elliptic Curve Diffie-Hellman

Trusted Execution Environment (TEE)

Figure 1:
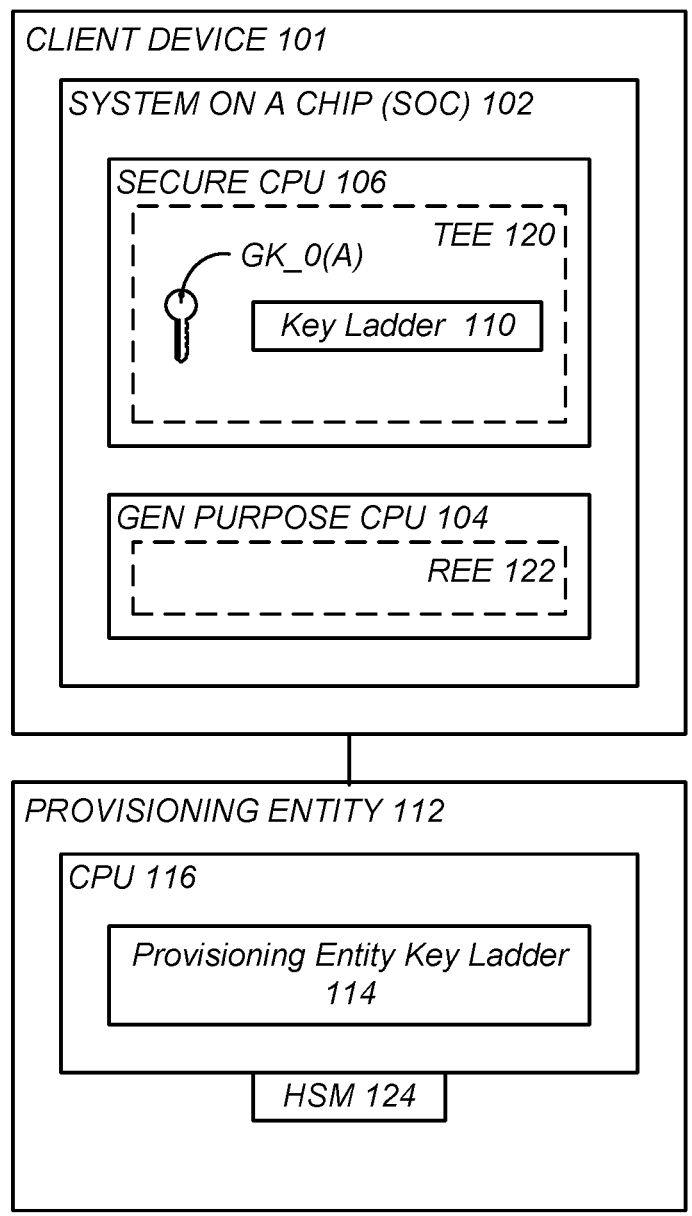
FIG. 1 is a diagram of a typical provisioning system.

FIG. 1 is a diagram of a typical provisioning system 100 comprising a client device 101 such as a set-top-box (STB) communicatively coupleable with a provisioning entity 112.

The STB 101A comprises a system-on-chip (SOC) 102 of a first type or model (for example, model A). The SOC 102 includes a secure CPU 106, with the SOC 102 having a secure CPU 106. The secure CPU 106 includes a communicatively coupled secure memory storing instructions for performing secure CPU operations. The secure CPU 106 implements a trusted execution environment (TEE) 120. DRM related operations are performed in the TEE 120 of the client device 101. Further, the SOC 102 implements a key ladder 110 using the secure CPU 106 of the client device 101. The TEE 120 implements a key ladder 110 that uses a global root key (GK_0). In one embodiment, the GK_0 is tamper proof and/or hardware-based.

The SOC 102 also comprises a general purpose host processor 104 (alternatively referred to hereinafter as a host processor or host CPU 104). The host CPU 104 also includes a communicatively coupled general purpose processor memory storing instructions for performing secure operations. The host CPU 104 implements a Rich Execution Environment (REE) 122. DRM systems are implemented at least in part using trusted applications (TAs) executed using the TEE of the device 101 implemented by the secure CPU 106 of the device, and may also be implemented at least in part by applications executed using the host CPU 104.

The provisioning entity 112 typically comprises a provisioning server that is used to provide personalization data and other information to the SOC 102 of each client device 101. The provisioning data may be provided in a factory environment or in the field after the client device 101 is deployed to the user.

To protect the personalization data, the data is typically encrypted in such a way that only a TA executed in the corresponding TEE 120 by the secure CPU 106 can decrypt it and recover the personalization data for use. The encrypted personalization is then packaged offline and then delivered to the device in the factory or in the field. In one embodiment, this is accomplished by use of a global hardware-based root keys (GK_0) of the associated secure CPU 106, the value of which is known to the provisioning entity 112.

For example, since the provisioning entity 112 knows the GK_0 of the secure CPU 106, the provisioning entity 112 uses that GK_0 along with a multi-stage key ladder 114 implemented by CPU 116 to encrypt the personalization data. That encrypted personalization data is provided to the SOC 102. Using the same GK_0, the secure CPU 106 decrypts the personalization data using a multi-stage secure key ladder 110 that is complementary to the multi-stage secure key ladder 114 implemented by the provisioning entity 112. Each GK_0 is typically specific to the model of the SOC 102.

Model-Based Encrypted Personalization Data

Figure 2:
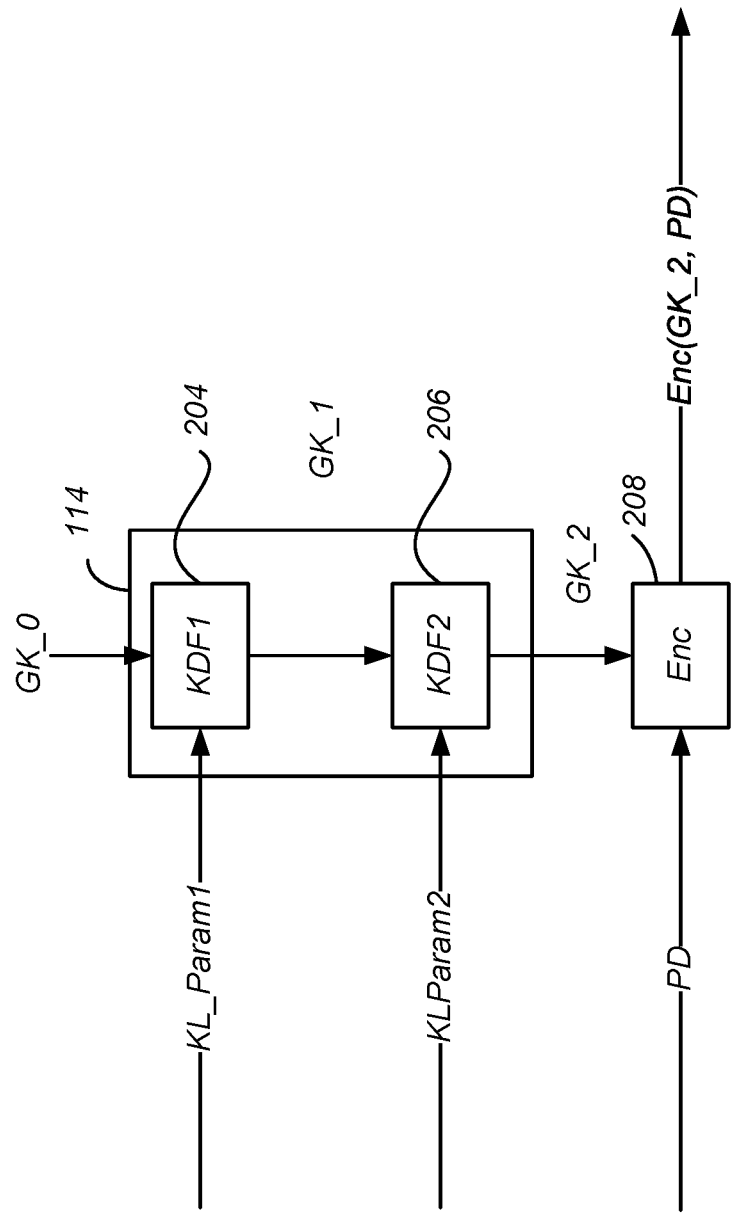
FIG. 2 is a diagram illustrating an exemplary technique to encrypt and store personalization data to a device provisioning system.

FIG. 2 is a diagram illustrating an exemplary technique to encrypt and store personalization data to a provisioning entity 112. The GK_0 is installed into the SOC 102 by the SOC vendor. That GK_0 is protected in hardware and its use is restricted to a TA running on the TEE 120 of the device.

A multi-layer global key ladder 114 is used to derive a final global key. For illustration purposes, FIG. 2 depicts a two-layer key ladder 114. In practice, this portion of the key ladder 114 could be single-layer, three-layer, or more. In each step of the key ladder, a global input parameter is used to derive the key for the next layer using a key derivation function KDF. In the illustrated embodiment, the key ladder 114 has two layers, so the final global key is referred to hereinafter as a second intermediate global key GK_2.

For example, a first global parameter (KL_Param1) and GK_0 is provided to a module 204 implementing a first key derivation function (KDF1) to generate a first intermediate global key (GK_1). Further, a second global parameter (KL_Param2) and the generated GK_1 are applied to a second module 206 implementing a second key derivation function (KDF2) to generate a second intermediate global key (GK_2). Derivation functions KDF1 and KDF2 could be implemented by any symmetric crypto algorithm. Note that the KL_Param1 and KL_Param2 may be generated randomly rather than created from GK_1 and GK_2.

Finally, the personalization data is encrypted by encryptor module 208 according to GK_2 to produce the encrypted personalization data Enc(GK_2,PD). In this case, the personalization data is directly encrypted using GK_2, and thereafter transmitted to the provisioning entity 112 for storage and eventual provisioning to a device 101.

Figure 3:
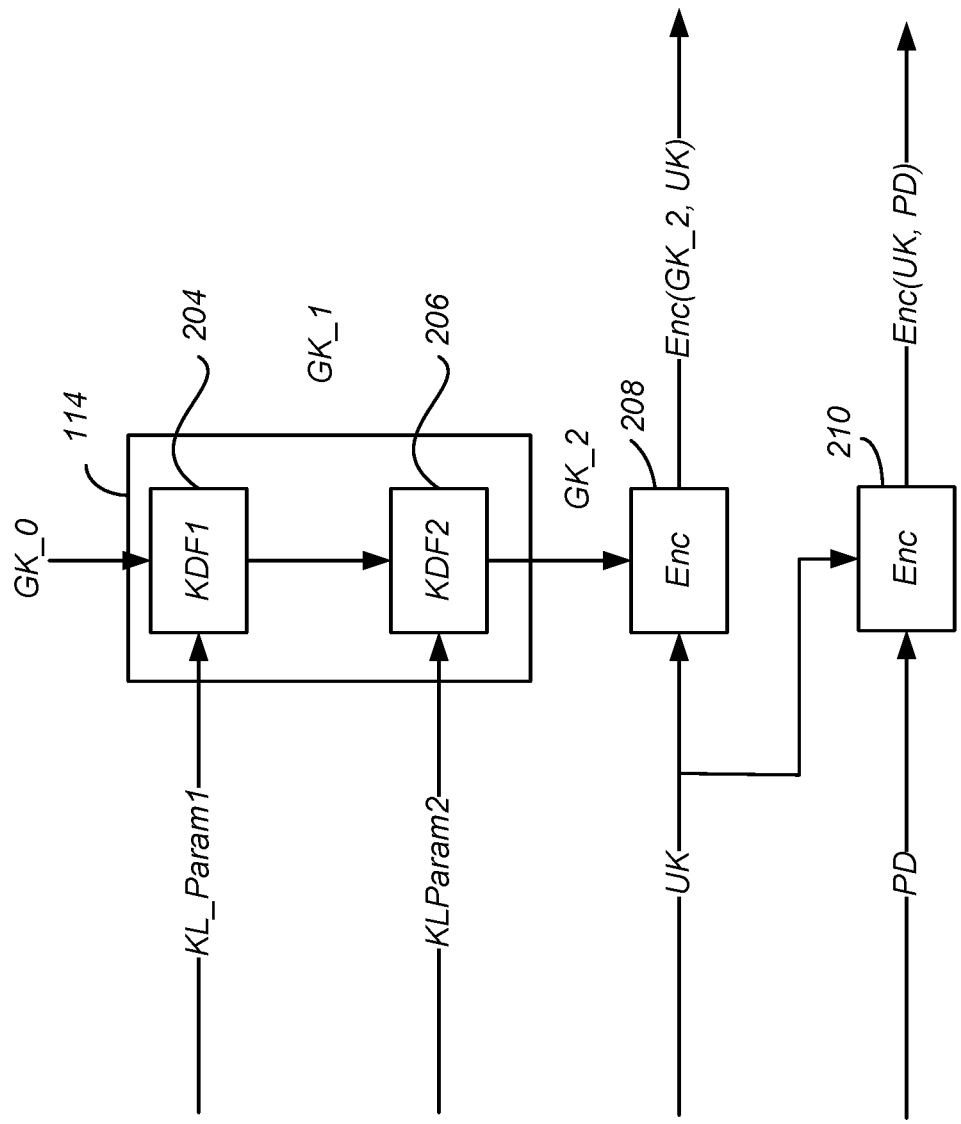
FIG. 3 is a diagram illustrating another embodiment of an exemplary technique to encrypt and store personalization data to a device provisioning system.

FIG. 3 is a diagram illustrating another embodiment of an exemplary technique to encrypt and store personalization data to a provisioning entity 112. In this embodiment, for added security, GK_2 is used to encrypt a random unique key (UK) using module 208, and the UK is used to encrypt the personalization data using module 210. Both the encrypted random unique key Enc(GK_2, UK) and the encrypted personalization data Enc(UK, PD) are packaged and transmitted to the provisioning entity 112 for storage and eventual provisioning to a device 101.

Figure 4A:
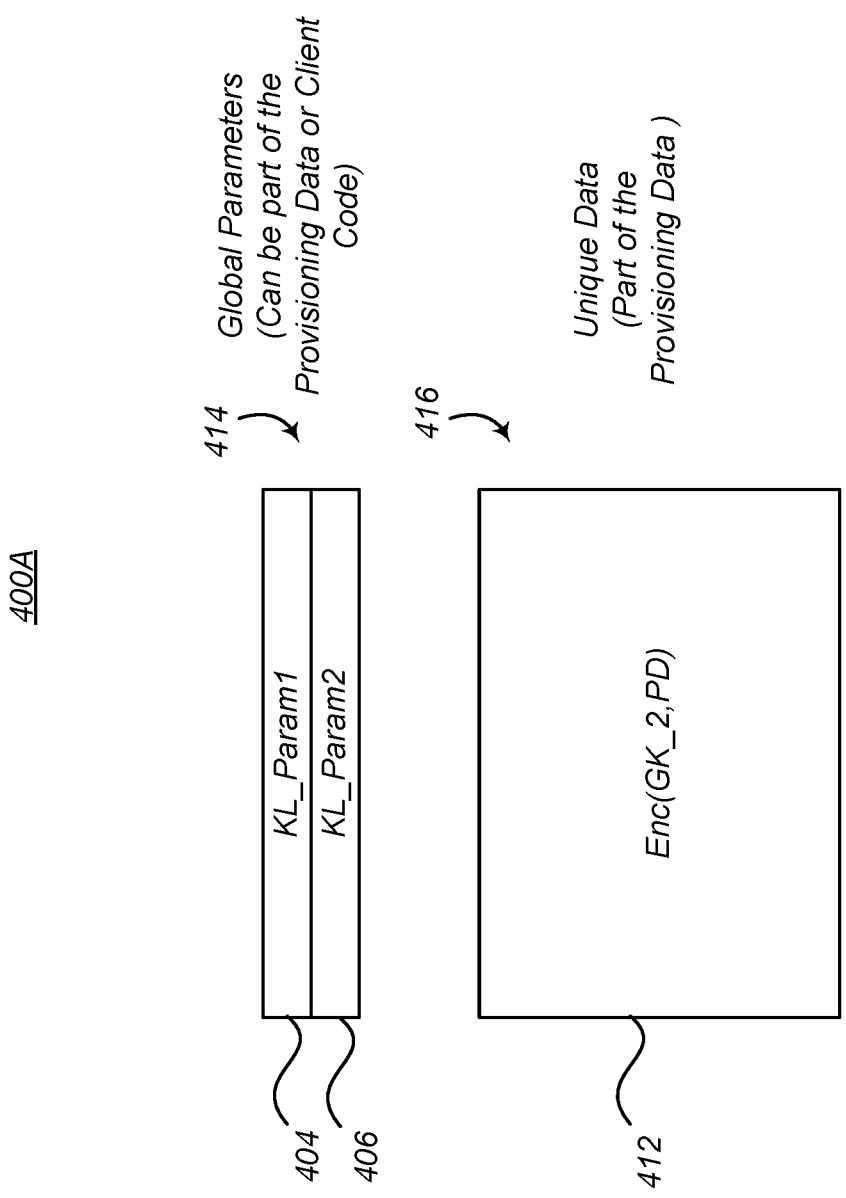

FIG. 4A is a diagram illustrating an exemplary embodiment of the packaged provisioning data 400A for the embodiment presented in FIG. 2 wherein the personalization data is encrypted with GK_2. The provisioning data 400A has unique data portion 416 and an optional global parameter portion 414. In embodiments where the global parameter portion 414 of the packaged provisioning data 400 is not included in the packaged provisioning data 400, the data of the global parameter portion 414 is provided to the client device 101 or SOC 102 by other means, for example, in the client code that processes the packaged provisioning data 400.

The global parameter portion 414 includes a first data segment 404 having K1_Param1 and a second data segment 406 having the K1_Param2. Of course, if longer key ladders are used, the optional global parameter portion 404-406 may include additional data. For example, if a three-level key ladders 110, 114 are used, a third global parameter (K1_Param3) may be included with the global parameter portion 414, and the associated final derived global key will be a third intermediate global key (GK_3) instead of GK_2. The mandatory data portion 416 includes a second segment 412 having the personalization data encrypted by the second global key GK_2.

FIG. 4B is a diagram illustrating an exemplary embodiment of the packaged provisioning data 400B for the embodiment presented in FIG. 3 wherein the personalization data is encrypted with UK and UK is encrypted by GK_2. In this embodiment, the mandatory unique data portion 416 includes a data segment 410 having the UK encrypted by GK_2 and a data segment 412 having the PD encrypted by the UK. In embodiments wherein other parameters are required, such parameters are encrypted by GK_2 and may be included in a data segment 410 or additional data segments of the unique data portion 416.

The packaged provisioning data 400A, 400B is provided to the provisioning entity 112, which stores the packaged provisioning data 400A, 400B for later provision to the client device 101 (after further encryption according to a client device unique key) or, as described below, for later retrieval to generate converted provisioning data that is provided to the client device 101.

Applying Device-Specific Unique Encryption During Provisioning

The above scheme is based on the GK_0 that is tied to a particular model of the SOC 102, and the same provisioning data is usable on any SOC 102 that is of that same particular model.

In field provisioning scenarios, a unique encryption specific to a particular SOC 102 (rather than a SOC 102 model) is desirable, so that the provisioning data can only be usable (decrypted) on the particular SOC 102 it is intended for. Also, for security reasons, the generation and packaging of the personalization data typically happens ahead of time in an offline facility. During this generation step, it is typical that the SOC 102 identities (chip ID, a unique serial number identifying each SOC 102) or any SOC 102 unique secrets are not known, or it would be undesirable to manage such information.

One way to tie a record of personalization data to a particular SOC 102 is to use a SOC-unique secret key instead of a global root key such as GK_0 as the root key to the key ladders 110, 114. However, the SOC-unique secret key may not be available to the entity doing the key generation and packaging, or it may be undesirable to manage such a key list.

Figure 5:
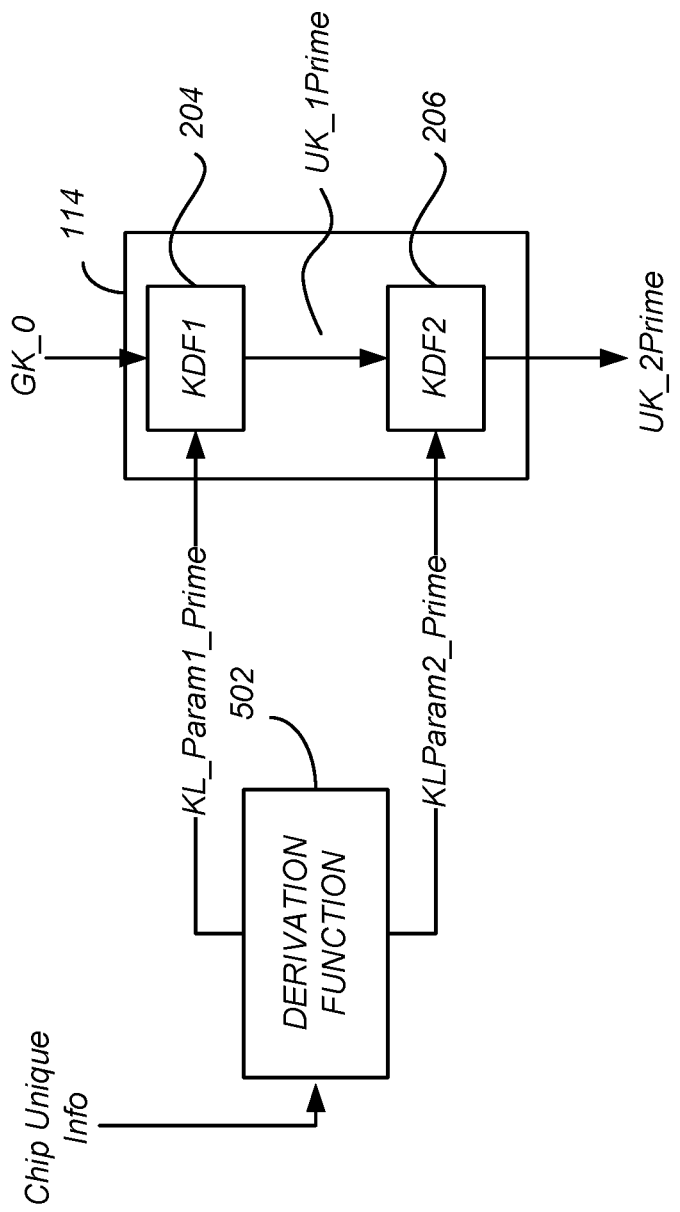
FIG. 5 is a diagram illustrating one embodiment of a technique that can be used to tie a record of personalization data to a particular system on a chip.

FIG. 5 is a diagram illustrating one embodiment of a technique that can be used to tie a record of personalization data to a particular device 101. In this technique, the client device 101 uses certain device-specific and unique information in the derivation of a device-specific unique encryption key (UK_2Prime).

In one embodiment, this is accomplished via information unique to the SOC 102 that includes the secure CPU 106 that computes the key ladder 110. In such embodiments, this device-specific information is therefore SOC-specific or chip-specific (hereinafter referred to as Chip Unique Info), as are the keys and other parameters derived therefrom. The Chip Unique Info may be a Chip ID that is provisioned to the SOC 102, or a measurement calculated inside the SOC 102, such as an encryption or decryption operation with a unique per-SOC hardware protected key. This Chip Unique Info is used with the global root key GK_0 to derive a device-specific unique encryption key (UK_2Prime).

In the following discussion, this Chip Unique Info is used to generate what is referred to as device-specific unique keys and parameters, but it is understood that device-specific unique keys and parameters could be generated with other device specific and unique information, and that when the device-specific unique keys and parameters are generated with Chip Unique Info, those keys and parameters are also SOC or chip-specific and unique.

The Chip Unique Info is used to derive the two new device-specific unique parameters, including a first device-specific unique parameter (KL_Param1Prime) and a second device-specific unique parameter (KL_Param2_Prime), using a cryptographic derivation function 502, such as SHA256 hash function or AES encrypt, decrypt, or CMAC function of the Chip Unique Info with a global hardware key (GK_0) in the SOC 102. KL_Param_Prime and KL_Param2_Prime then replace the original KL_Param1 and KL_Param2, respectively and KL_Param1_Prime and KL_Param2_Prime are used (along with GK_0) with KDF1

204 and KDF2 206 to generate a derived final device-specific unique key. Since a two-stage key ladder 114 is used, this final device-specific unique key is a derived second intermediate device-specific unique key (UK_2Prime). The resulting UK_2Prime is tied to the specific SOC 102 (via the Chip Unique Info) and can only be derived on a SOC 102 with that Chip Unique Info and having GK_0 embedded in hardware.

Note that in general, the Chip Unique Info used in the above process just needs to be used to derive and change at least one of the key ladder 110, 114 parameters. In other words, it does not need to change all the key ladder 110, 114 parameters, as long as the final device-specific unique key (UK_2Prime in this case) is different. In another example, the number of key ladder parameters that are changed can be itself a random value generated by the provisioning entity 112. The new device-specific key UK_2Prime is then used to encrypt the personalization data PD directly (if UK is not used), or encrypt the unique key UK (if UK is used).

Since the Chip Unique Info may not be available during key generation, a method is described below to convert Model-Specific Encrypted Personalization Data (the personalization data stored in the provisioning entity 112 in encrypted form) to SOC-specific uniquely encrypted personalization data during the provisioning process. The conversion is performed by a provisioning entity 112 or server, typically communicating with the client devices 101. Since the provisioning entity 112 may be used to provision personalization data to fielded client devices 101, communications between the provisioning entity 112 and the client device 101 are typically via the Internet. Accordingly, one of the design objectives of the method that follows is to minimize the possibility of exposure of any secrets or sensitive information.

The process of converting the personalization data from globally encrypted to device-specific uniquely encrypted that is directed toward a particular client device 101 can be summarized as follows. If the unique key UK (analogous to the UK discussed in connection with FIG. 3) is used, it is kept unchanged such that the personalization data does not need to be decrypted during the conversion process. Second, a hardware security module (HSM) 124 is used to protect all keys and the process of generating them needed for the conversion whenever possible. Intermediate keys are "unwrapped" and "re-wrapped" inside the HSM 124 instead of decrypted in the clear to the memory of the provisioning entity 112. Finally, the operations needed to perform the conversion are minimized so that the conversion process is efficient.

Figure 6:
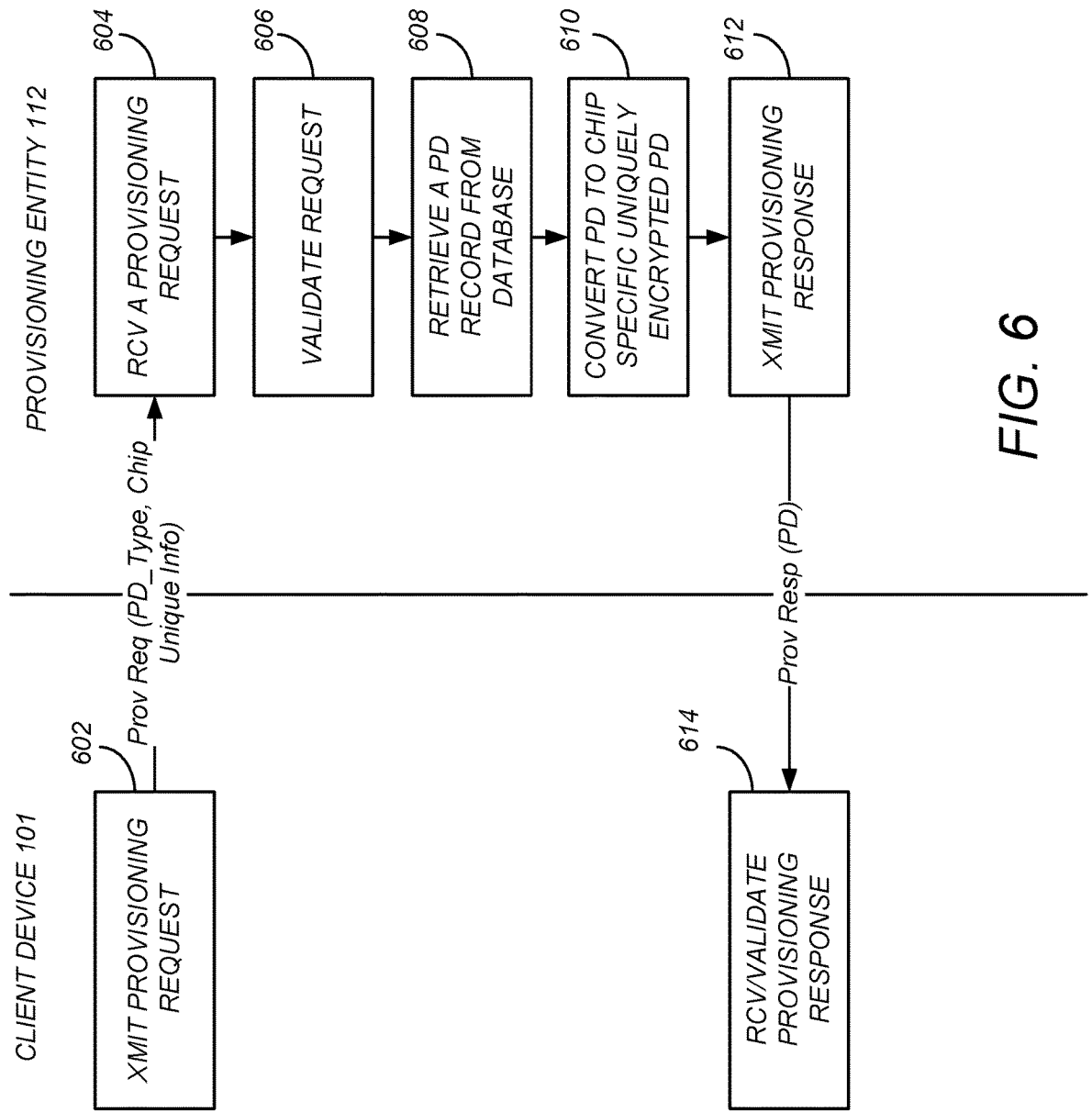
FIG. 6 is a diagram illustrating one embodiment of the process of provisioning device-specific uniquely encrypted personalization data to a client device converted from original globally encrypted personalization data.

FIG. 6 is a diagram illustrating one embodiment of the process of provisioning device-specific uniquely encrypted personalization data to a client device 101. As described above, the client device 101 has a global root key GK_0 and a secure processing environment having unique information, such as the Chip Unique Info.

In this example, the client device 101 requests personalization data that is encrypted in a way that is device-specific and unique.

In block 602, the client device transmits a provisioning request. The provisioning request comprises the unique information (Chip Unique Info), and an identifier of the type of provisioning data requested (PD Type). In block 604, the provisioning entity 112 accepts the provisioning request from the device 101. In block 606, the provisioning entity 112 validates the request. If the request is signed, the provisioning entity 112 also verifies the signature of the provisioning request, and that the device 101 is authorized to request the specific type of personalization data identified in the provisioning request. In block 608, the provisioning entity 112 retrieves a record of the requested type of personalization data from a communicatively coupled database. In block 610, the provisioning entity performs the conversion process described in more detailed below (in section "Provisioning Data Conversion") to convert the globally encrypted (for example, model based) personalization data to the requested device-specific uniquely encrypted personalization data tied to the Chip Unique Info provided in the provisioning request. In block 612, the provisioning entity 112 sends the resulting converted personalization data to the client device 101 in a response message, which may also be signed by the provisioning entity's signing certificate. Finally, in block 614, the client device 101 performs validation of the response message and the personalization data, and installs the provisioning data.

The message exchanges between the client device 101 and provisioning entity 112 may include additional session-based encryption, e.g. using key agreement (such as Diffie-Hellman or Elliptic-Curve Diffie-Hellman) algorithm. For example, a transport layer security (TLS) session may be set up between the client device 101 and the provisioning entity 112 prior to the provisioning message exchange. Alternatively, the key agreement public keys may be exchanged in the provisioning request and the provisioning response.

Figure 7:
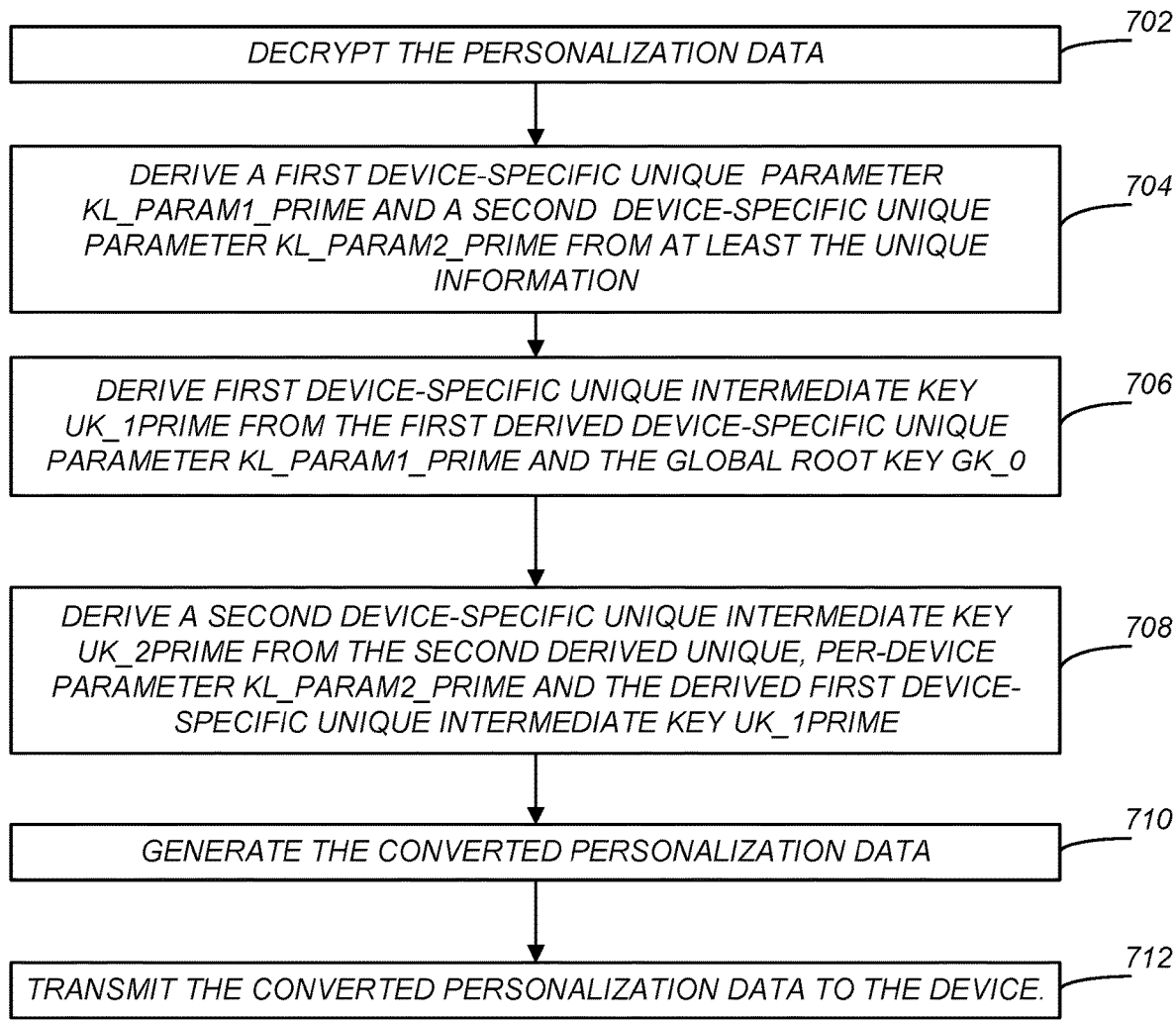
FIG. 7 is a diagram illustrating an exemplary technique for converting the personalization data from globally encrypted to device-specific uniquely encrypted.

FIG. 7 is a diagram illustrating an exemplary technique for converting the personalization data from model-based globally encrypted to device-specific uniquely encrypted. First, the globally encrypted personalization data PD (Enc(GK_2, PD) or Enc(UK, PD) and Enc(GK_2, UK) is retrieved. This may simply be retrieved by the provisioning entity 112 from storage, such as a database. However, to further protect the initially provisioned personalization data, such data is preferably stored with additional layer of encryption that may be decrypted only by the provisioning entity 112. Accordingly, the globally encrypted personalization data previously stored in the provisioning entity 112 is decrypted, as shown in block 702. Since the original globally personalization data was encrypted by the second intermediate global key GK_2, that key must be retrieved or regenerated to decrypt the original globally encrypted personalization data. In one embodiment, the second intermediate global key GK_2 is preloaded into the HSM 124 of the provisioning entity 112, and does not need to be derived. In another embodiment the second intermediate global key GK_2 is not preloaded into the HSM 124, and must therefore be rederived. This is accomplished by performing the operations described in FIG. 2 (if the personalization data PD was encrypted directly by the second intermediate global key GK_2, resulting in Enc(GK_2, PD)), or by performing the operations of FIG. 3 (if the personalization data PD was encrypted by the unique key UK, and the unique key UK was encrypted by the second intermediate global key GK_2). In either case, the second intermediate global key GK_2 must be derived or retrieved. This can be accomplished by deriving the first intermediate global key GK_1 from the parameter KL_Param1 and global root key GK_0 (which is securely stored and protected in the HSM 124 of the provisioning entity 112) using KDF1 204. Then, using the first intermediate global key GK_1, deriving the second intermediate global key GK_2 with KL_Param2 obtained from the provisioning data 400A stored by the provisioning entity 112.

The operations to obtain the decrypted personalization data depend upon whether the personalization data was simply encrypted with the second intermediate global key GK_2 (as shown in FIG. 2) or encrypted with the unique key UK (as shown FIG. 3). If the personalization data PD was simply encrypted with second intermediate global key GK_2, this is used to decrypt the personalization data PD in the HSM 124, for example, by making a PKCS #11 application program interface (API) call "C_Unwrap( )" with the parameter Enc(GK_2, PD) from the original globally encrypted personalization data. If the personalization data was encrypted with the unique key UK (as shown in FIG. 4), the second intermediate global key GK_2 is used to decrypt the unique key UK in the HSM 124, for example by making a PKCS #11 API call "C_Unwrap( )" with the parameter Enc(GK_2, UK) from the stored provisioning data 400B, then using the decrypted unique key UK to decrypt the encrypted personalization data Enc(UK, PD) to derive the personalization data.

Returning to FIG. 7, block 704 derives a first device-specific unique parameter (KL_Param1Prime) and a second device-specific unique parameter (KL_Param2_Prime) from the SOC Unique Info received in the provisioning request using the designated derivation function 502. In one embodiment, KL_Param1_Prime and KL_Param2_Prime may also be generated using random values generated by the provisioning entity 112 in addition to the SOC Unique Info for added security.

Block 706 accesses the global root key GK_0 from the HSM, and uses the global root key GK_0 to generate a first intermediate device-specific unique key (UK_1Prime) from KL_Param1_Prime. Block 708 generates a derived second intermediate device-specific unique key (UK_2Prime) from the second derived device-specific unique parameter KL_Param2_Prime and the first intermediate device-specific unique key UK_1Prime.

Block 710 generates the converted personalization data. How this is accomplished depends on whether it is desired to encrypt the personalization data with the derived second intermediate UK_2Prime or desired to encrypt the personalization data using the unique key UK.

If the personalization data is to be encrypted by the derived second intermediate key, UK_2Prime is used to "wrap" the personalization data that was unwrapped above to generate encrypted converted personalization data Enc (UK_2Prime, PD). In one embodiment, this is accomplished by making a PKCS #11 API call "C_Wrap( )" with the personalization data and UK_2Prime as arguments If the personalization data is to be encrypted by UK, UK_2Prime is used to wrap the UK that was unwrapped in the HSM 124 above) to generate a new encrypted unique key Enc(UK_2Prime, UK). In one embodiment, this is accomplished by making a PKCS #11 API call "C_Wrap( )" with the arguments UK_2Prime and UK.

As shown in block 712, the converted personalization data is transmitted to the client device 101. In one embodiment, this is accomplished by generating converted provisioning data that comprises the converted personalization data. The converted provisioning data can be generated by removing KL_Param1 from data segment 404 and removing KL_Param2 from data segment 406. These values are no longer needed as the analogous KL_Param1_Prime and KLParam2_Prime can be derived directly by the client device 101 using the on-board SOC-Unique Info and derivation function 502. If random values were used in generating KL_Param1_Prime KLParam2_Prime, those random values can be inserted into data segments 404 and 406 (and potentially additional data segments if necessary).

In one embodiment, the converted personalization data is encrypted according to the derived second intermediate device-specific unique key Enc(UK_2Prime, PD) and placed into data segment 412. The resulting converted provisioned data 800A is illustrated in FIG. 8A.

Figure 8B:
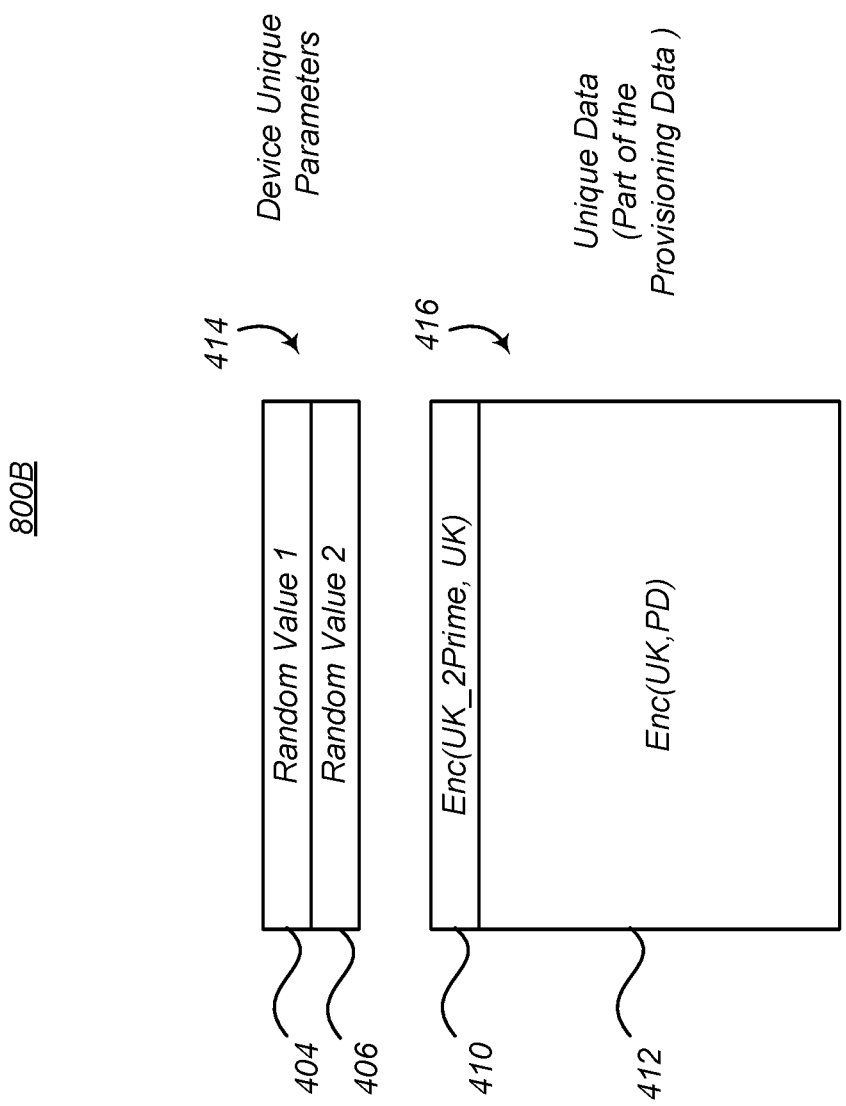

In another embodiment, the converted personalization data is encrypted according to the UK is already in place in segment 412, and all that is required is to encrypt UK with the derived second intermediate device-specific unique key Enc(UK_2Prime, PD), and place that value into data segment 410. The resulting converted provisioned data 800B is illustrated in FIG. 8B.

A trusted application executed by the client device 101 then query the chip 102 itself for the Chip Unique Info, and then uses the Chip Unique Info to derive GK2_Prime using its hardware key ladder starting from GK_0, as previously illustrated in FIG. 5. In the embodiment in which the personalization data is encrypted directly by the second intermediate device-specific unique key UK_2Prime, this key is used to decrypt the personalization data, which can then be installed in the device 101. In the embodiment in which the personalization data is encrypted by unique key UK, and the unique key UK is encrypted by the second intermediate device-specific unique key UK_2Prime, the unique key UK is recovered using UK_2Prime, and the recovered UK is used to decrypt the personalization data.

In the above conversion process, some of the intermediate keys may be protected by the HSM 124 if the key ladder 114 uses certain cryptographic operations. For example, if key derivation functions KDF1 204 and KDF2 206 are symmetric cryptographic operations such as triple data encryption (TDES) or advanced encryption standard (AES) encrypt or decrypt functions, then instead of doing the encrypt or decrypt operation, PKCS #11 API calls "Wrap" or "Unwrap" can be used. The resulting intermediate keys (such as GK1_Prime and GK2_Prime) then reside within the HSM 124 and not available in software outside of the HSM 124.

Other examples of the key derivation functions that can be used to perform the key ladder operations include Diffie-Hellman (DH) or Elliptic Curve Diffie-Hellman (ECDH) based functions. For example, GK_0 could be a DH private key and KL_Param1_Prime (which is derived from the Chip Unique Info) may be used as the DH Public key. Then a PKCS #11 API call "C_DeriveKey( )" may be used to derive the DH shared secret GK1_Prime as a session key inside the HSM.

Hardware Environment

Figure 9:
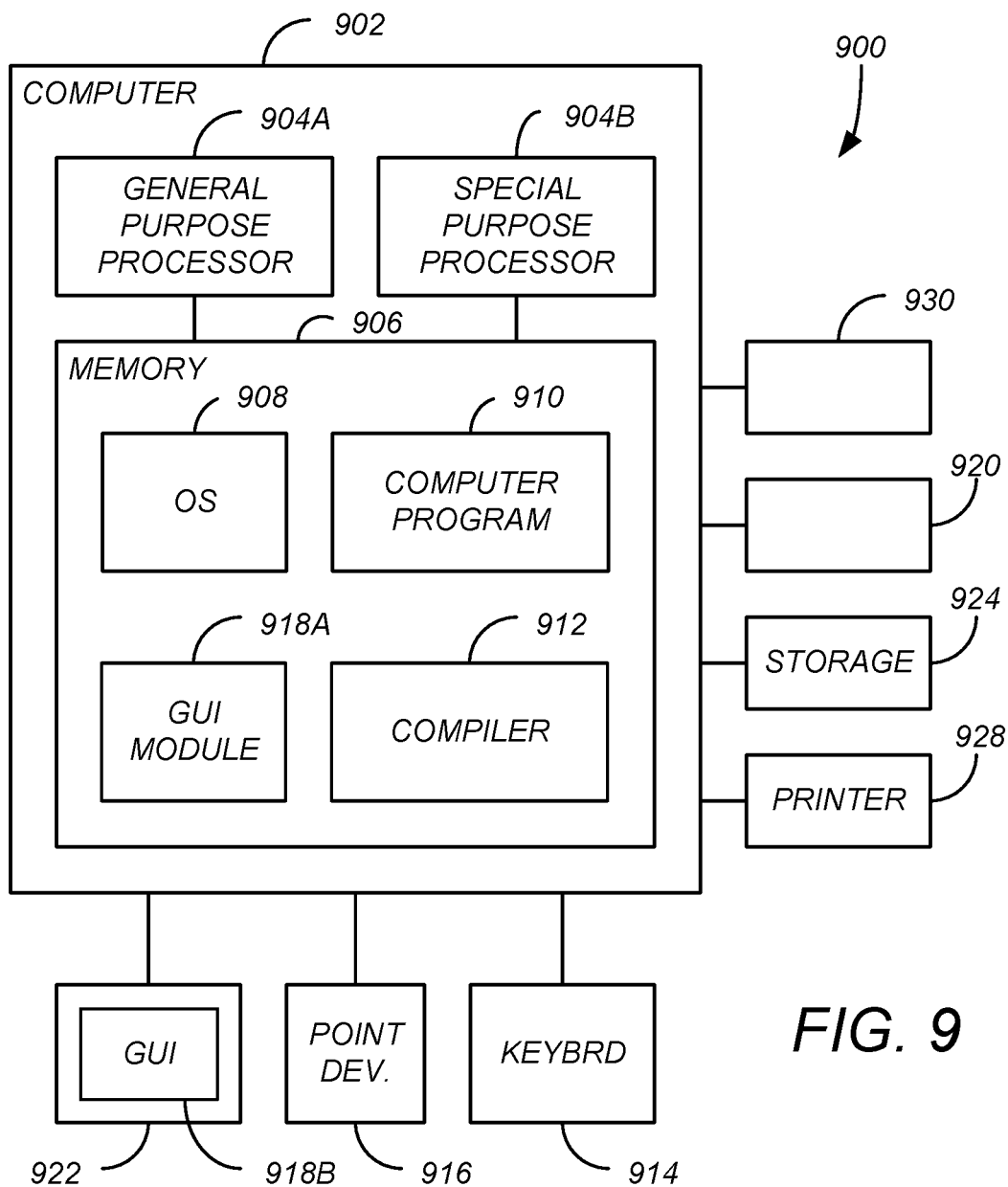
FIG. 9 illustrates an exemplary computer system that could be used to implement processing elements of the system.

FIG. 9 illustrates an exemplary computer system 900 that could be used to implement processing elements of the above disclosure, including the client device 101, provisioning entity 112, and HSM 124. The computer 902 comprises a processor 904 and a memory, such as random access memory (RAM) 906. The computer 902 is operatively coupled to a display 922, which presents images such as windows to the user on a graphical user interface 918B. The computer 902 may be coupled to other devices, such as a keyboard 914, a mouse device 916, a printer 928, etc. Of course, those skilled in the art will recognize that any combination of the above components, or any number of different components, peripherals, and other devices, may be used with the computer 902.

Generally, the computer 902 operates under control of an operating system 908 stored in the memory 906, and interfaces with the user to accept inputs and commands and to present results through a graphical user interface (GUI) module 918A. Although the GUI module 918B is depicted as a separate module, the instructions performing the GUI functions can be resident or distributed in the operating system 908, the computer program 910, or implemented with special purpose memory and processors. The computer 902 also implements a compiler 912 which allows an application program 910 written in a programming language such as COBOL, C++, FORTRAN, or other language to be translated into processor 904 readable code. After completion, the application 910 accesses and manipulates data stored in the memory 906 of the computer 902 using the relationships and logic that was generated using the compiler 912. The computer 902 also optionally comprises an external communication device such as a modem, satellite link, Ethernet card, or other device for communicating with other computers.

In one embodiment, instructions implementing the operating system 908, the computer program 910, and the compiler 912 are tangibly embodied in a computer-readable medium, e.g., data storage device 920, which could include one or more fixed or removable data storage devices, such as a zip drive, floppy disc drive 924, hard drive, CD-ROM drive, tape drive, etc. Further, the operating system 908 and the computer program 910 are comprised of instructions which, when read and executed by the computer 902, causes the computer 902 to perform the operations herein described. Computer program 910 and/or operating instructions may also be tangibly embodied in memory 906 and/or data communications devices 930, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

Conclusion

This concludes the description of the preferred embodiments of the present disclosure.

The foregoing discloses an apparatus, method and system for provisioning device-specific uniquely encrypted personalization data to a device, the device having a global root key GK_0 and a secure processing environment having unique information.

The method comprises accepting a provisioning request from the device, the provisioning request comprising the unique information and an identifier of a type of provisioning data requested, converting the personalization data from globally-encrypted personalization data to the device-specific uniquely encrypted personalization data, and transmitting the converted personalization data to the device.

The globally-encrypted personalization data is generated by generating a first intermediate global key GK_1 from a first global parameter KL_Param1 and the global root key GK_0, generating a second intermediate global key GK_2 from a second global parameter KL_Param2 and the first intermediate global key GK_1, globally-encrypting the personalization data, and providing the globally-encrypted personalization data to a provisioning entity for storage.

Converting the personalization data from the globally-encrypted personalization data to the device-specific personalization data comprises decrypting the globally-encrypted personalization data, deriving a first device-specific unique parameter KL_Param1_Prime and a second device-specific unique parameter KL_Param2_Prime from at least the unique information, deriving a first intermediate device-specific unique key UK_1Prime from the derived first device-specific unique parameter KL_Param1_Prime and the global root key GK_0, deriving a second intermediate device-specific unique key UK_2Prime from the derived second device-specific unique parameter KL_Param2_Prime and the derived first intermediate device-specific unique key UK_1Prime, and generating the device-specific uniquely encrypted personalization data as the converted personalization data from the decrypted globally-encrypted personalization data and the derived second intermediate device-specific unique key UK_2Prime.

Implementations may include one or more of the following features:

Any of the methods described above, wherein: globally-encrypting the personalization data includes: encrypting the personalization data according to the second intermediate global key GK_2; providing the encrypted personalization data to a provisioning entity for storage includes: transmitting the globally-encrypted personalization data Enc(GK_2, PD) to the provisioning entity, decrypting the encrypted personalization data includes: decrypting the globally-encrypted personalization data Enc(GK_2, PD) according to the second intermediate global key GK_2; generating the device-specific uniquely encrypted personalization data as the converted personalization data from the decrypted globally-encrypted personalization data and the derived second intermediate device-specific unique key UK_2Prime includes: re-encrypting the decrypted globally-encrypted personalization data according to the derived second intermediate device-specific unique key UK_2Prime to produce the device-specific uniquely encrypted personalization data; and transmitting the converted personalization data includes: transmitting the device-specific uniquely encrypted personalization data having the re-encrypted personalization data Enc(UK_2Prime, PD) to the device.

Any of the methods described above wherein: transmitting the globally-encrypted personalization data Enc(GK_2, PD) to the provisioning entity includes: generating provisioning data including the globally-encrypted personalization data Enc(GK_2, PD); wherein the provisioning data further includes the first global parameter KL_parm1 and the second global parameter KL_parm2. The methods may also include transmitting the generated provisioning data including the globally-encrypted personalization data Enc(GK_2, PD) to the provisioning entity; transmitting the converted device-specific uniquely encrypted personalization data having the re-encrypted personalization data Enc(UK_2Prime, PD) to the device includes: generating converted provisioning data including the re-encrypted personalization data Enc(UK_2Prime, PD), including: removing the first global parameter KL_parm1 and the second global parameter KL_parm2 from the provisioning data. The methods may also include transmitting the generated converted provisioning data including the re-encrypted personalization data Enc(UK_2Prime, PD) to the device.

Any of the methods described above wherein: the derived first device-specific unique parameter KL_param1_Prime and the derived second device-specific unique parameter KL_param2_Prime are further derived from random values; and generating converted provisioning data including the re-encrypted personalization data Enc(UK_2Prime, PD) further includes: inserting the random values used to derive the derived first device-specific unique parameter KL_param1_Prime and the derived second device-specific unique parameter KL_param2_Prime in the converted provisioning data.

Any of the methods described above wherein: globally-encrypting the personalization data includes: encrypting the personalization data according to a unique key UK, resulting in Enc(UK, PD); and globally-encrypting the unique key according to the second intermediate global key, resulting in Enc(GK_2, UK); providing the encrypted personalization data to a provisioning entity for includes: transmitting the personalization data encrypted according to a unique key UK (Enc(UK, PD)) and the globally-encrypted unique key Enc(GK_2, UK) to the provisioning entity; decrypting the personalization data includes: decrypting the globally-encrypted unique key Enc(GK_2, UK) according to the second intermediate global key GK_2; and decrypting the encrypted personalization data Enc(UK, PD) according to the decrypted unique key UK; generating the device-specific uniquely encrypted personalization data as the converted personalization data from the decrypted encrypted personalization data and the derived second intermediate device-specific unique key UK_2Prime includes: encrypting the personalization data according to a unique key UK, resulting in Enc(UK, PD); and encrypting the unique key according to the derived second intermediate device-specific unique key, resulting in Enc(UK_2Prime, UK); and transmitting the converted personalization data includes: transmitting the personalization data encrypted according to a unique key UK Enc(UK, PD) and the encrypted unique key Enc (UK_2Prime, UK) to the device.

Any of the methods described above wherein: transmitting the personalization data encrypted according to a unique key UK (Enc(UK, PD)) and the globally-encrypted unique key Enc(GK_2, UK) to the provisioning entity includes: generating provisioning data including the unique key UK (Enc(UK, PD)) and the globally-encrypted unique key Enc (GK_2, UK); wherein the provisioning data further includes the first global parameter KL_parm1 and the second global parameter KL_parm2. The methods may also include transmitting the generated provisioning data including the unique key UK (Enc(UK, PD)) and the encrypted unique key Enc(GK_2, UK) to the provisioning entity; and transmitting the personalization data encrypted according to a unique key UK (Enc(UK, PD)) and the encrypted unique key Enc (UK_2Prime, UK) to the device includes: generating converted provisioning data including the personalization data encrypted according to a unique key UK (Enc(UK, PD)) and the encrypted unique key Enc(UK_2Prime, UK), including: transmitting the generated converted provisioning data including the personalization data encrypted according to a unique key UK Enc(UK, PD) and the encrypted unique key Enc(GK_2, UK).

Any of the methods described above wherein: the derived first device-specific unique parameter KL_param1_Prime and the derived second device-specific unique parameter KL_param2_Prime are further derived from random values; and generating converted provisioning data including the personalization data encrypted according to a unique key UK, resulting in Enc(UK, PD) and the encrypted unique key Enc(GK_2, UK) further includes: inserting the random values used to derive the derived first device-specific unique parameter KL_param1_Prime and the derived second device-specific unique parameter KL_param2_Prime in the provisioning data. The method wherein: the globally-encrypted personalization data includes device model-based provisioning data; and the device-specific uniquely encrypted of personalization data encrypted to a specific chip.

Other embodiments are evidenced by a an apparatus having a processor and a memory storing processor instructions for implementing the foregoing methods.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:
1. A method of provisioning device-specific uniquely encrypted personalization data to a device, the device having a global root key GK_0 and a secure processing environment having unique information, the method comprising:
    accepting a provisioning request from the device, the provisioning request comprising the unique information and an identifier of a type of provisioning data requested;
    converting the personalization data from globally-encrypted personalization data to the device-specific uniquely encrypted personalization data, wherein:
        the globally-encrypted personalization data is generated by:
            generating a first intermediate global key GK_1 from a first global parameter KL_Param1 and the global root key GK_0;
            generating a second intermediate global key GK_2 from a second global parameter KL_Param2 and the first intermediate global key GK_1;
            globally-encrypting the personalization data;
            providing the globally-encrypted personalization data to a provisioning entity for storage; and
        the converting the personalization data from the globally-encrypted personalization data to the device-specific personalization data comprises:
            decrypting the globally-encrypted personalization data;
            deriving a first device-specific unique parameter KL_Param1_Prime and a second device-specific unique parameter KL_Param2_Prime from at least the unique information;
            deriving a first intermediate device-specific unique key UK_1Prime from the derived first device-specific unique parameter KL_Param1_Prime and the global root key GK_0;
            deriving a second intermediate device-specific unique key UK_2Prime from the derived second device-specific unique parameter KL_Param2_Prime and the derived first intermediate device-specific unique key UK_1Prime;
            generating the device-specific uniquely encrypted personalization data as the converted personalization data from the decrypted globally-encrypted personalization data and the derived second intermediate device-specific unique key UK_2Prime; and
    transmitting the converted personalization data to the device.
2. The method of claim 1, wherein:
    the globally-encrypted personalization data comprises device model-based provisioning data; and the device-specific uniquely encrypted of personalization data encrypted to a specific chip.

3. The method of claim 1, wherein:
globally-encrypting the personalization data comprises:
encrypting the personalization data according to the second intermediate global key GK_2;
providing the encrypted personalization data to a provisioning entity for storage comprises:
transmitting the globally-encrypted personalization data Enc(GK_2, PD) to the provisioning entity;
decrypting the encrypted personalization data comprises:
decrypting the globally-encrypted personalization data Enc(GK_2, PD) according to the second intermediate global key GK_2;
generating the device-specific uniquely encrypted personalization data as the converted personalization data from the decrypted globally-encrypted personalization data and the derived second intermediate device-specific unique key UK_2Prime comprises:
re-encrypting the decrypted globally-encrypted personalization data according to the derived second intermediate device-specific unique key UK_2Prime to produce the device-specific uniquely encrypted personalization data; and
transmitting the converted personalization data comprises:
transmitting the device-specific uniquely encrypted personalization data having the re-encrypted personalization data Enc(UK_2Prime, PD) to the device.

4. The method of claim 3, wherein:
transmitting the globally-encrypted personalization data Enc(GK_2, PD) to the provisioning entity comprises:
generating provisioning data comprising the globally-encrypted personalization data Enc(GK_2, PD);
wherein the provisioning data further comprises the first global parameter KL_Parm1 and the second global parameter KL_Parm2;
transmitting the generated provisioning data comprising the globally-encrypted personalization data Enc(GK_2, PD) to the provisioning entity;
transmitting the converted device-specific uniquely encrypted personalization data having the re-encrypted personalization data Enc(UK_2Prime, PD) to the device comprises:
generating converted provisioning data comprising the re-encrypted personalization data Enc(UK_2Prime, PD), comprising:
removing the first global parameter KL_Parm1 and the second global parameter KL_Parm2 from the provisioning data; and
transmitting the generated converted provisioning data comprising the re-encrypted personalization data Enc(UK_2Prime, PD) to the device.

5. The method of claim 4, wherein:
the derived first device-specific unique parameter KL_Param1_Prime and the derived second device-specific unique parameter KL_Param2_Prime are further derived from random values; and
generating converted provisioning data comprising the re-encrypted personalization data Enc(UK_2Prime, PD) further comprises:
inserting the random values used to derive the derived first device-specific unique parameter KL_Param1_Prime and the derived second device-specific unique parameter KL_Param2_Prime in the converted provisioning data.

6. The method of claim 1, wherein:
globally-encrypting the personalization data comprises:
encrypting the personalization data according to a unique key UK, resulting in Enc(UK, PD); and
globally-encrypting the unique key according to the second intermediate global key, resulting in Enc(GK_2, UK);
providing the encrypted personalization data to a provisioning entity for comprises:
transmitting the personalization data encrypted according to a unique key UK (Enc(UK, PD)) and the globally-encrypted unique key Enc(GK_2, UK) to the provisioning entity;
decrypting the personalization data comprises:
decrypting the globally-encrypted unique key Enc(GK_2, UK) according to the second intermediate global key GK_2; and
decrypting the encrypted personalization data Enc(UK, PD) according to the decrypted unique key UK;
generating the device-specific uniquely encrypted personalization data as the converted personalization data from the decrypted encrypted personalization data and the derived second intermediate device-specific unique key UK_2Prime comprises:
encrypting the personalization data according to a unique key UK, resulting in Enc(UK, PD); and
encrypting the unique key according to the derived second intermediate device-specific unique key, resulting in Enc(UK_2Prime, UK); and
transmitting the converted personalization data comprises:
transmitting the personalization data encrypted according to a unique key UK Enc(UK, PD) and the encrypted unique key Enc(UK_2Prime, UK) to the device.

7. The method of claim 6, wherein:
transmitting the personalization data encrypted according to a unique key UK (Enc(UK, PD)) and the globally-encrypted unique key Enc(GK_2, UK) to the provisioning entity comprises:
generating provisioning data comprising the unique key UK (Enc(UK, PD)) and the globally-encrypted unique key Enc(GK_2, UK);
wherein the provisioning data further comprises the first global parameter KL_Parm1 and the second global parameter KL_Parm2;
transmitting the generated provisioning data comprising the unique key UK (Enc(UK, PD)) and the encrypted unique key Enc(GK_2, UK) to the provisioning entity; and
transmitting the personalization data encrypted according to a unique key UK (Enc(UK, PD)) and the encrypted unique key Enc(UK_2Prime, UK) to the device comprises:
generating converted provisioning data comprising the personalization data encrypted according to a unique key UK (Enc(UK, PD)) and the encrypted unique key Enc(UK_2Prime, UK), comprising:
transmitting the generated converted provisioning data comprising the personalization data encrypted according to a unique key UK Enc(UK, PD) and the encrypted unique key Enc(GK_2, UK).

8. The method of claim 7, wherein:
the derived first device-specific unique parameter KL_Param1_Prime and the derived second device-specific unique parameter KL_Param2_Prime are further derived from random values; and generating converted provisioning data comprising the personalization data encrypted according to a unique key UK, resulting in Enc(UK, PD) and the encrypted unique key Enc(GK_2, UK) further comprises:
inserting the random values used to derive the derived first device-specific unique parameter KL_Param1_Prime and the derived second device-specific unique parameter KL_Param2_Prime in the provisioning data.

9. An apparatus for provisioning device-specific uniquely encrypted personalization data to a device, the device having a global root key GK_0 and a secure processing environment having unique information, comprising:
a processor;
a memory, communicatively coupled to the processor, the memory storing processor instructions comprising instructions for:
accepting a provisioning request from the device, the provisioning request comprising the unique information and an identifier of a type of provisioning data requested;
converting the personalization data from globally-encrypted personalization data to the device-specific uniquely encrypted personalization data, wherein:
the globally-encrypted personalization data is generated by:
generating a first intermediate global key GK_1 from a first global parameter KL_Param1 and the global root key GK_0;
generating a second intermediate global key GK_2 from a second global parameter KL_Param2 and the first intermediate global key GK_1;
globally-encrypting the personalization data;
providing the globally-encrypted personalization data to a provisioning entity for storage;
converting the personalization data from the globally-encrypted personalization data to the device-specific personalization data comprises:
decrypting the globally-encrypted personalization data;
deriving a first device-specific unique parameter KL_Param1_Prime and a second device-specific unique parameter KL_Param2_Prime from at least the unique information;
deriving a first intermediate device-specific unique key UK_1Prime from the derived first device-specific unique parameter KL_Param1_Prime and the global root key GK_0;
deriving a second intermediate device-specific unique key UK_2Prime from the derived second device-specific unique parameter KL_Param2_Prime and the derived first intermediate device-specific unique key UK_1Prime;
generating the device-specific uniquely encrypted personalization data as the converted personalization data from the decrypted globally-encrypted personalization data and the derived second intermediate device-specific unique key UK_2Prime; and
transmitting the converted personalization data to the device.

10. The apparatus of claim 9, wherein:
the globally-encrypted personalization data comprises device model-based provisioning data; and
the device-specific uniquely encrypted of personalization data encrypted to a specific chip.

11. The apparatus of claim 9, wherein:
the instructions for globally encrypting the personalization data comprise instructions for:
encrypting the personalization data according to the second intermediate global key GK_2;
the instructions for providing the encrypted personalization data to a provisioning entity for storage comprise instructions for:
transmitting the globally-encrypted personalization data Enc(GK_2, PD) to the provisioning entity;
the instructions for decrypting the encrypted personalization data comprise instructions for:
decrypting the globally-encrypted personalization data Enc(GK_2, PD) according to the second intermediate global key GK_2;
the instructions for generating the device-specific uniquely encrypted personalization data as the converted personalization data from the decrypted globally-encrypted personalization data and the derived second intermediate device-specific unique key UK_2Prime comprise instructions for:
re-encrypting the decrypted globally-encrypted personalization data according to the derived second intermediate device-specific unique key UK_2Prime to produce the device-specific uniquely encrypted personalization data; and
the instructions for transmitting the converted personalization data comprise instructions for:
transmitting the device-specific uniquely encrypted personalization data having the re-encrypted personalization data Enc(UK_2Prime, PD) to the device.

12. The apparatus of claim 11, wherein:
the instructions for transmitting the globally-encrypted personalization data Enc(GK_2, PD) to the provisioning entity comprise instructions for:
generating provisioning data comprising the globally-encrypted personalization data Enc(GK_2, PD);
wherein the provisioning data further comprises the first global parameter KL_Parm1 and the second global parameter KL_Parm2; and
transmitting the generated provisioning data comprising the globally-encrypted personalization data Enc (GK_2, PD) to the provisioning entity;
the instructions for transmitting the converted device-specific uniquely encrypted personalization data having the re-encrypted personalization data Enc(UK_2Prime, PD) to the device comprise instructions for:
generating converted provisioning data comprising the re-encrypted personalization data Enc(UK_2Prime, PD), comprising:
removing the first global parameter KL_Parm1 and the second global parameter KL_Parm2 from the provisioning data; and
transmitting the generated converted provisioning data comprising the re-encrypted personalization data Enc(UK_2Prime, PD) to the device.

13. The apparatus of claim 12, wherein:
the derived first device-specific unique parameter KL_Param1_Prime and the derived second device-specific unique parameter KL_Param2_Prime are further derived from random values; and the instructions for generating converted provisioning data comprising the re-encrypted personalization data Enc(UK_2Prime, PD) further comprise instructions for:
    inserting the random values used to derive the derived first device-specific unique parameter KL_Param1_Prime and the derived second device-specific unique parameter KL_Param2_Prime in the converted provisioning data.

14. The apparatus of claim 9, wherein:
the instructions for globally-encrypting the personalization data comprise instructions for:
    encrypting the personalization data according to a unique key UK resulting in Enc(UK, PD); and
    globally-encrypting the unique key according to the second intermediate global key resulting in Enc(GK_2, UK);
the instructions for providing the encrypted personalization data to a provisioning entity for comprise instructions for:
    transmitting the personalization data encrypted according to a unique key UK (Enc(UK, PD)) and the globally-encrypted unique key Enc(GK_2, UK) to the provisioning entity;
the instructions for decrypting the personalization data comprise instructions for:
    decrypting the encrypted unique key Enc(GK_2, UK) according to the second intermediate global key GK_2; and
    decrypting the encrypted personalization data Enc(UK, PD) according to the decrypted unique key UK;
the instructions for generating the device-specific uniquely encrypted personalization data as the converted personalization data from the decrypted encrypted personalization data and the derived second intermediate device-specific unique key UK_2Prime comprise instructions for:
    encrypting the personalization data according to a unique key UK Enc(UK, PD); and
    encrypting the unique key according to the derived second intermediate device-specific unique key, resulting in Enc(UK_2Prime, UK); and
the instructions for transmitting the converted personalization data comprises instructions for:
    transmitting the personalization data encrypted according to a unique key UK (Enc(UK, PD)) and the encrypted unique key Enc(UK_2Prime, UK) to the device.

15. The apparatus of claim 14, wherein:
the instructions for transmitting the personalization data encrypted according to a unique key UK Enc(UK, PD) and the globally-encrypted unique key (Enc(GK_2, UK)) to the provisioning entity comprise instructions for:
    generating provisioning data comprising the unique key UK (Enc(UK, PD)) and the globally-encrypted unique key Enc(GK_2, UK);
        wherein the provisioning data further comprises the first global parameter KL_Parm1 and the second global parameter KL_Parm2;
    transmitting the generated provisioning data comprising the unique key UK (Enc(UK, PD)) and the encrypted unique key Enc(GK_2, UK) to the provisioning entity; and
the instructions for transmitting the personalization data encrypted according to a unique key UK (Enc(UK, PD)) and the encrypted unique key Enc(UK_2Prime, UK) to the device comprise instructions for:
    generating converted provisioning data comprising the personalization data encrypted according to a unique key UK Enc(UK, PD) and the encrypted unique key Enc(UK_2Prime, UK), comprising:
        transmitting the generated converted provisioning data comprising the personalization data encrypted according to a unique key UK Enc(UK, PD) and the encrypted unique key Enc(GK_2, UK).

16. The apparatus of claim 15, wherein:
the derived first device-specific unique parameter KL_Param1_Prime and the derived second device-specific unique parameter KL_Param2_Prime are further derived from random values; and
the instructions for generating converted provisioning data comprising the personalization data encrypted according to a unique key UK resulting in Enc(UK, PD) and the encrypted unique key Enc(GK_2, UK) further comprise instructions for:
    inserting the random values used to derive the derived first device-specific unique parameter KL_Param1_Prime and the derived second device-specific unique parameter KL_Param2_Prime in the provisioning data.

* * * * *